United States Patent [19]
Laslo

[11] Patent Number: 5,512,072
[45] Date of Patent: Apr. 30, 1996

[54] FLUE GAS SCRUBBING APPARATUS

[75] Inventor: Dennis J. Laslo, Lebanon, Pa.

[73] Assignee: General Electric Environmental Services, Inc., Lebanon, Pa.

[21] Appl. No.: 349,659

[22] Filed: Dec. 5, 1994

[51] Int. Cl.$^6$ ....................................................... B01F 3/04
[52] U.S. Cl. ............................ 55/250; 261/18.1; 261/117; 261/87
[58] Field of Search .................................... 261/18.1, 117, 261/87; 55/248, 250

[56] References Cited

U.S. PATENT DOCUMENTS

| | | | |
|---|---|---|---|
| 3,210,914 | 10/1965 | Eckert | 261/117 |
| 3,343,341 | 9/1967 | Wiemer | 55/250 |
| 3,885,929 | 5/1975 | Lyon et al. | 55/250 |
| 3,971,642 | 7/1976 | Perez | 55/250 |
| 4,507,253 | 3/1985 | Wiesmann | 261/117 |

FOREIGN PATENT DOCUMENTS

| | | | |
|---|---|---|---|
| 1341435 | 9/1963 | France | 55/248 |
| 0162270 | 12/1979 | Japan | 261/117 |
| 0092125 | 7/1980 | Japan | 261/117 |

*Primary Examiner*—Tim R. Miles
*Attorney, Agent, or Firm*—Domenica N. S. Hartman; Robert C. Lampe, Jr.

[57] ABSTRACT

A spray tower is provided for removing gases and particulate matter from flue gases which are produced by processing operations of the type carried out in utility and industrial facilities. The spray tower is configured so as to minimize its overall height, such that construction, operational and maintenance costs of the tower are also minimized. A tank located at the base of the tower serves as a reservoir for an alkaline slurry used to remove gases and particulate matter from the flue gases. The slurry is pumped from the tank to spraying devices located within the tower. An inlet is located above the tank through which the flue gases are introduced into the tower. Disposed within the tower and adjacent the inlet is an enclosure having an upper end joined to the tower and a lower end defining an opening. Spraying devices are located within the enclosure, preferably at approximately the same height as the inlet, so as to enable the overall height of the tower to be reduced.

19 Claims, 2 Drawing Sheets

FLUE GAS SCRUBBING APPARATUS

This invention generally relates to gas-liquid contactors used in the removal of particulate matter and acidic gases from utility and industrial combustion gases. More particularly, this invention is directed to a spray tower which is configured with an internal structure that enables sprayers to be positioned within the structure at approximately the same height as the inlet duct into the tower, such that the overall height of the tower can be minimized.

BACKGROUND OF THE INVENTION

Gas-liquid contactors are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, such that their emission into the atmosphere is closely regulated by clean air statutes. The method by which such gases are removed with a spray tower or other type of gas-liquid contactor is known as wet flue gas desulfurization.

The cleansing action produced by a gas-liquid contactor is generally derived from the passage of gas upwardly through a tower countercurrently to a descending liquid which cleans the air. Wet flue gas desulfurization processes typically involve the use of calcium-based slurries or sodium-based or ammonia-based solutions. As used herein, a slurry is a mixture of solids and liquid in which the solids content can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; $CaO$). Such slurries react with the acidic gases to form precipitates which can be collected for disposal or recycling. Intimate contact between the alkaline slurry and acidic gases which are present in the flue gases, such as sulfur dioxide, hydrogen chloride (HCl) and hydrogen fluoride (HF), result in the absorption of the gases by the slurry. Thereafter, the slurry can be accumulated in a tank.

A known type of gas-liquid contactor is a spray tower 10, an example of which is shown in cross-section in FIG. 1. The spray tower 10 generally is an upright structure composed of a tower 14 equipped with an inlet duct 12 through which combustion gases enter the tower 14. The inlet duct 12, as well as other appropriate sections of the tower 14, are preferably formed from a high nickel alloy so as to promote their corrosion resistance. Above the inlet duct 12 is a lower bank of spray headers 16 which introduce a spray 20 of a cleansing liquid, often an alkaline slurry, into the tower 14. A second, upper bank of spray headers 18 is typically provided above the lower bank of spray headers 16, with additional banks of spray headers being used as may be required for a given application. One or more pumps 26 are required to recycle the cleansing liquid by pumping the liquid from a tank 30 to the banks of spray headers 16 and 18. Each bank of spray headers 16 and 18 may be individually equipped with a pump 26 for the purpose of promoting the flexibility of the pumping and spraying operation to accommodate varying demands by the scrubbing operation.

Intimate contact between the liquid spray 20 and the flue gases rising through the tower 14 results in a cleansing action, by which the liquid and the entrapped or reacted gases are collected at the bottom of the tower 14 in the tank 30. The cleansed gases which continue to rise through the tower 14 then typically pass through a mist eliminator 22, and thereafter are either heated or passed directly to the atmosphere through a chimney 24.

Due to structural considerations, conventionally-accepted design practices typically limit the width of the inlet duct 12 to about 2/3 of the diameter of the tower 14. In addition, the first bank of spray headers 16 must typically be about six to about ten feet (about 2 to about 3 meters) above the inlet duct 12, so as to provide a suitable volume for gas-liquid mass transfer time, during which gases are absorbed by the liquid, and to prevent the liquid spray 20 from entering the inlet duct 12, which would otherwise create a slurry and particulate buildup requiring periodic removal. Conventional practices also typically limit the flue gas velocity within the inlet duct 12 to about fifty to about sixty feet per second (about fifteen to about eighteen meters per second) for the purpose of maintaining an acceptable pressure drop and gas distribution within the tower 14. The above limitations generally dictate both the height of the inlet duct 12 and the position of the first bank of spray headers 16 relative to the inlet duct 12.

In view of the above, it can be appreciated that the tower diameter, the height of the inlet duct 12, and the distance of the first bank of spray headers 16 above the inlet duct 12 must all be increased in order to accommodate increased flue gas flows through the spray tower 10. Consequently, the overall size and height of the spray tower 10 is dependent on the amount of flue gases to be scrubbed. In turn, taller spray towers 10 necessitate more powerful pumps 26 to pump the liquid to the spray headers 16 and 18, whose vertical height must also increase so as to position the spray headers 16 and 18 sufficiently above the inlet duct 12.

Those skilled in the art will appreciate that, in view of the considerations noted above, it would be desirable to minimize the height of a flue gas spray tower for the purpose of minimizing construction, operational and maintenance costs of the tower and the scrubbing operation.

SUMMARY OF THE INVENTION

It is an object of this invention to provide a flue gas scrubbing apparatus for the removal of particulate matter and acidic gases from flue gases produced by utility and industrial facilities.

It is a further object of this invention that such a scrubbing apparatus be constructed and configured so as to minimize the height of the apparatus for a given flue gas processing capacity.

It is still a further object of this invention that construction and material costs for the scrubbing apparatus be reduced as a result of its construction and configuration.

Lastly, it is yet another object of this invention that such a scrubbing apparatus be equipped with an internal structure which enables the placement of spray headers within the apparatus to approximately coincide with the inlet duct to the apparatus.

The present invention provides a spray tower for removing gases and particulate matter from flue gases which are produced by processing operations of the type carried out in utility and industrial plants. The spray tower is generally composed of a tower having a lower end and an upper end, with a tank being located near the lower end of the tower. The tank serves as a reservoir for a liquid, such as an alkaline slurry, which is used to remove the gases and particulate matter from the flue gases. A pumping device is preferably provided for pumping the liquid accumulated in the tank to devices which introduce the liquid, such as by spraying, into the tower. The tower is equipped with an inlet located above the tank through which the flue gases are introduced into the tower.

Disposed within the tower and adjacent the inlet is an enclosure having an upper end joined to the tower and a lower end defining an opening. The enclosure may have a cylindrical shape or a tapered shape in which the upper end of the enclosure has a larger diameter than the lower end of the enclosure. The opening is preferably located vertically below at least a portion of the inlet, such that flue gases introduced into the tower through the inlet are directed downwardly from the inlet and toward the opening prior to rising through the tower. At least one bank of spraying devices is positioned within the enclosure and adjacent the opening of the enclosure. These spraying devices are positioned such that the liquid will accumulate in the tank.

Finally, the spray tower preferably includes a mist eliminating device above the spraying devices for removing liquid particles from the flue gases flowing through the tower. An outlet is disposed at the upper end of the tower through which the cleansed flue gases escape the spray tower.

Because the spray tower is configured to include the enclosure, the height of the lowest bank of spraying devices can be located at approximately the same height as the inlet or, if desired, below the inlet. As a result, the overall height of the spray tower can be minimized for a given inlet height, in that the lowest bank of spraying devices are not required to be spaced a sufficient distance above the inlet so as to provide a suitable volume for gas-liquid mass transfer time. As a result, the construction, operational and maintenance costs of the tower are also minimized.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
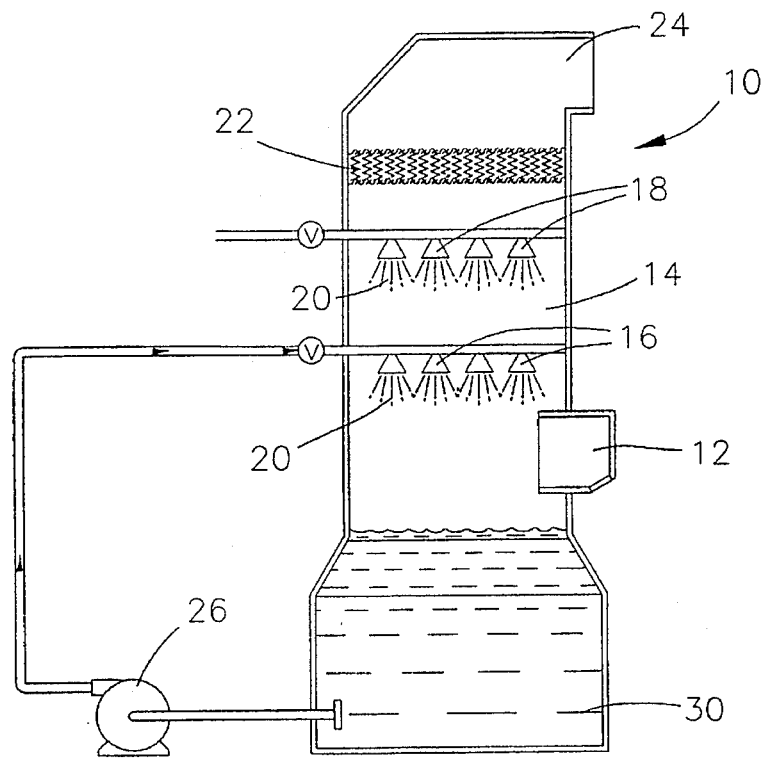
FIG. 1 shows in cross-section a spray tower of a type known in the prior art.
Figure 2:
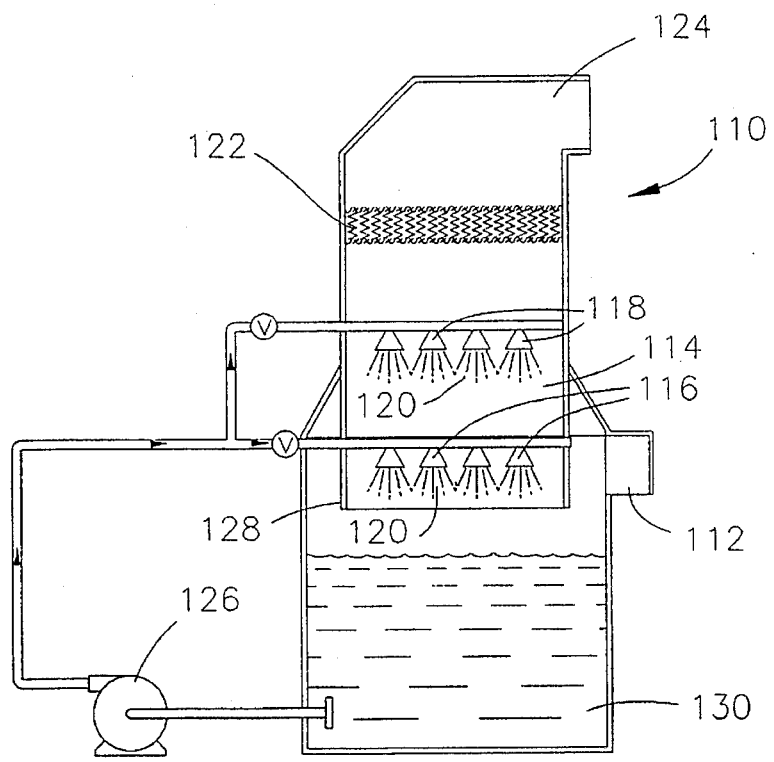
FIG. 2 shows in cross-section a spray tower in accordance with a first embodiment of this invention.
Figure 3:
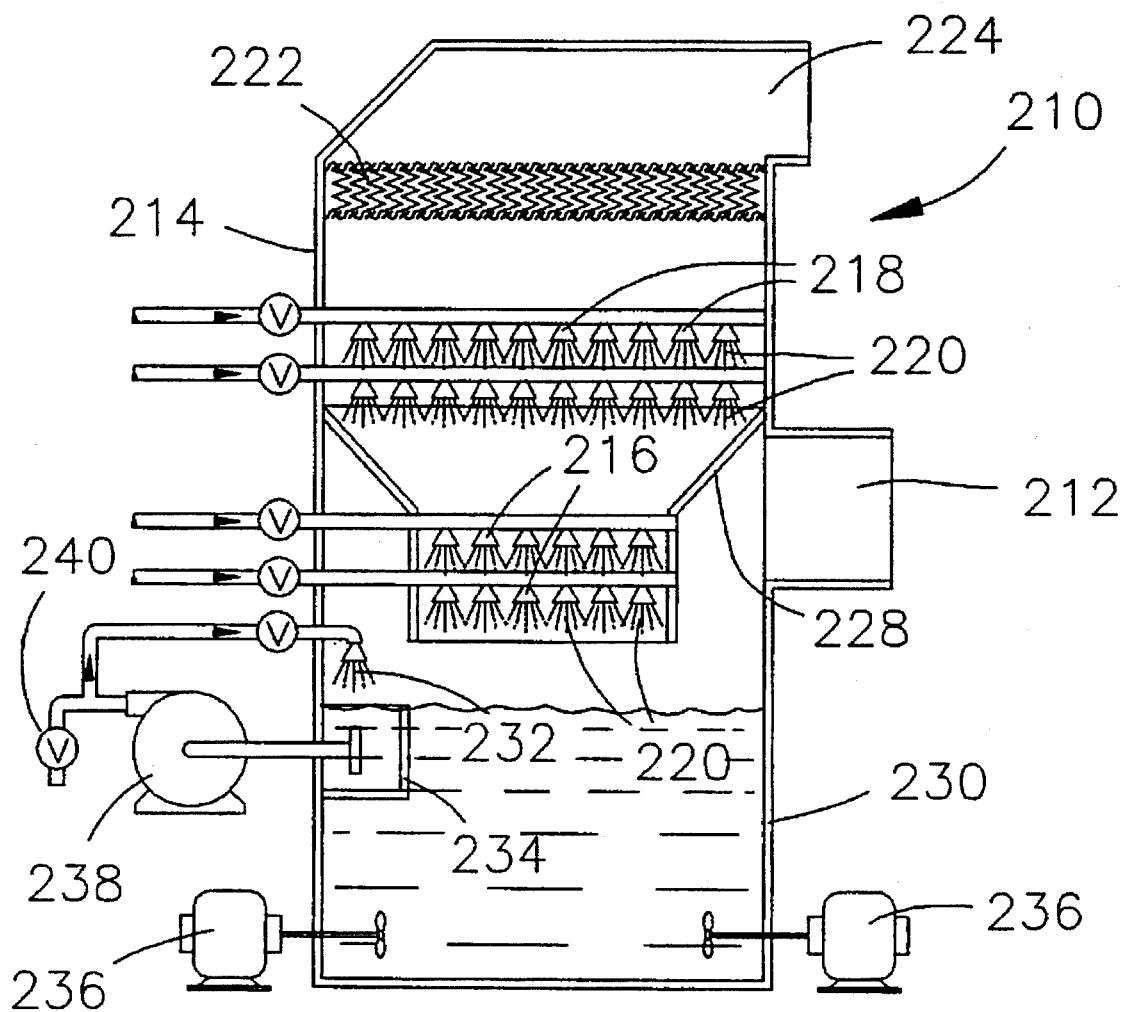
FIG. 3 shows in cross-section a spray tower in accordance with a second embodiment of this invention.

FIGS. 2 and 3 illustrate flue gas scrubbers in the form of spray towers 110 and 210 configured in accordance with the teachings of the present invention. As illustrated, the towers 110 and 210 have a basic structural configuration which is similar to that of the prior art tower 10 shown in FIG. 1. However, in accordance with this invention, the towers 110 and 210 each include internal enclosures or aprons 128 and 228 which enable the overall height of the towers 110 and 210 to be minimized. As a result, the construction, operational and maintenance costs of the towers 110 and 210 are significantly reduced.

While the towers 110 and 210 are illustrated as being of a particular construction, those skilled in the art will recognize that the teachings of this invention can be readily applied to various other structures which serve to remove undesirable gases, mist, dust, fumes, smoke and/or particulate matter from a volume of gas.

The spray tower 110 shown in FIG. 2 generally has an upright structure composed of a tower 114. As illustrated, the tower 114 has an upper section, a lower section having a larger cross-section than the upper section, and a tapered section between and interconnecting the upper and lower sections. The lower section of the tower 114 is equipped with an inlet duct 112 which forms an opening at the perimeter of the tower 114 through which flue gases enter the tower 114. The source of the flue gases may be a process involving the combustion of fossil fuels or various industrial operations by which undesirable gases or particulate matter are produced.

As with prior art spray towers of the type illustrated in FIG. 1, a reservoir or tank 130 is formed at the lower end of the tower 110 in which a liquid is held. For purposes of removing acidic gases and particulate matter from flue gases, the liquid is typically an alkaline slurry, often composed of lime (calcium oxide; CaO) or limestone ($CaCO_3$) suspended in water, though other types of cleansing liquids are known and could be used. A pump 126 is fluidically interconnected with the tank 130 for the purpose of delivering the slurry from the tank 130 to banks of spray headers 116 and 118 within the tower 114. The spray headers 116 and 118 produce a spray 120 of the slurry within the tower 114, so as to provide for intimate contact between the spray 120 and the flue gases rising through the tower 114. The result is a cleansing action by which the slurry and entrapped or reacted gases are collected at the bottom of the tower 114 in the tank 130. While spray headers are shown in FIG. 2, it is foreseeable that other types of devices could be used for introducing the slurry to the tower 114, including atomizers and trays.

Also located above the inlet duct 112 and within the upper section of the tower 114 is a mist eliminator 122 of any suitable type known in the art. Above the mist eliminator 122 is a chimney 124 through which gases may pass from the spray tower 110 may be heated or passed directly into the atmosphere.

By themselves, the individual structures are generally conventional or of a type known in the art, and therefore do not encompass the inventive subject matter of this invention. Nor do the above structures constitute a limitation to the scope of the present invention.

In accordance with this invention, the apron 128 is disposed adjacent the inlet duct 112 and within the tower 114, generally within the lower section of the tower 114. The apron 128 may have a cylindrical shape, though other shapes may be used. The apron 128 is joined at its upper end to the wall of the tower 114 while its lower end is suspended above the tank 130. The lower end of the apron 128 defines an opening through which flue gases introduced into the tower 114 by the inlet duct 112 can flow into the upper section of the tower 114. As shown, the opening is disposed entirely below the inlet duct 112, though it is foreseeable that the lower end of the apron 128 could terminate adjacent the inlet duct 112. Preferably, the opening to the apron 128 lies in a horizontal plane, such that the flue gases will enter the tower 114 along the entire perimeter of the apron 128. As a result, the flue gas distribution within the tower 114 is significantly enhanced, and thereby promotes the gas-liquid mass transfer characteristics of the tower 114.

A lower bank 116 of the spray headers 116 and 118 is located within the apron 128 and at approximately the same height as the inlet duct 112. As noted above, the lower bank of spray headers 116 introduce the alkaline slurry into the tower 114 in the form of a spray 120. A second, upper bank 118 of the spray headers 116 and 118 is provided above the lower bank of spray headers 116 and within the upper section of the tower 114. Additional banks of spray headers may be used as required to provide an adequate flow of slurry for removing undesirable components from the flue gases. The cleansed gases then continue to rise through the tower 114 and pass through the mist eliminator 122, where liquid particles are removed from the gases. Thereafter, the gases continue to the chimney 124 and into the atmosphere.

As described above, the apron 128 serves to reduce the height of the tower 114 by allowing the lower bank of spray headers 116 to be positioned significantly closer to the inlet duct 112 than that possible with prior art spray towers. For example, where prior art spray towers require the lowest bank of spray headers to be placed at least about six feet (two meters) above the inlet duct, the lower bank of spray headers 116 of this invention are located at approximately the same height as the inlet duct 112, thereby reducing the overall height of the tower 114 by about six feet (two meters).

The apron 128 is also beneficial because it promotes flue gas distribution within the tower 114 by introducing the flue gases along the entire perimeter of its lower end. Consequently, the height of the inlet duct 112 can also be minimized, in that there is a reduced tendency for the flue gases to stratify to the wall of the tower 114 opposite the inlet, which would otherwise result in a less homogenous distribution of flue gases within the tower 114. In addition, because the inlet duct 112 is not directly subjected to the alkaline slurry, it can be formed from a carbon steel instead of a more expensive high nickel alloy as conventionally required in the prior art.

An additional advantage of the spray tower 110 of this invention is that a lower powered pump 126 can be used since the vertical distance between the tank 130 and the banks of spray headers 116 and 118 is reduced. Though a slightly higher gas side pressure drop results from the presence of the apron 128, the operating costs incurred by this effect are more than offset by the lower operating costs made possible by the reduced heights of the tower 114 and spray headers 116 and 118.

Illustrated in FIG. 3 is a second embodiment of this invention. As with the first embodiment, the spray tower 210 of FIG. 3 has an upright construction composed of a tower 214. As before, a lower section of the tower 214 is equipped with an inlet duct 212 through which flue gases enter the tower 214, and a tank 230 is formed at the lower end of the tower 210 in which an alkaline slurry is held. Located within the upper section of the tower 214 is a mist eliminator 222 and a chimney 224.

In contrast to the first embodiment of FIG. 2, the upper and lower sections of the tower 214 are generally of the same size and shape. Accordingly, and in accordance with this second embodiment of the invention, the apron 228 is formed to have a tapered shape, with the lower end of the apron 228 being smaller in cross-section than the upper end of the apron 228. As with the previous embodiment, the apron 228 is joined at its upper end to the wall of the tower 214 while its lower end is suspended above the tank 230. The lower end of the apron 228 defines an opening through which flue gases introduced into the tower 214 by the inlet duct 212 can flow into the upper section of the tower 214.

A lower bank 216 of the spray headers 216 and 218 is located within the apron 228 at approximately the same height as the inlet duct 212, while an upper bank 218 of the spray headers 216 and 218 is located in the upper section of the tower 214. A pump (not shown) serves to pump the slurry from the tank 230 to the banks of spray headers 216 and 218 within the tower 214 and the apron 228.

In addition to the reconfigured apron 228, the spray tower 210 of the second embodiment also differs from the spray tower 110 of the first embodiment by the inclusion of a baffled section 234 within the tank 230 from which slurry is drawn to feed one or more spray headers 232 located between the lower section of the tower 214 and the apron 228. A pump 238 is provided to pump the slurry from the baffled section 234 to the spray header 232. A valve 240, is provided through which a portion of the slurry can be delivered to a dewatering device (not shown) of a type known in the art, for the purpose of extracting solid precipitates, such as gypsum ($CaSO_4 \cdot 2H_2O$), from the slurry.

Because alkali is added to the tank 230 and not the baffled section 234, the slurry drawn from the baffled section 234 has a lower pH. As such, the spray header 232 serves to absorb sulfur dioxide and lower the pH of the slurry, so as to enable limestone to be more readily dissolved. If gypsum is the desired byproduct of the slurry, the gypsum will be of higher purity, and the overall alkali consumption of the scrubbing process will be lower. The spray tower 210 preferably includes aerators 236 which assist in distributing oxygen and solids in the slurry within the tank 230. As is known in the art, sulfur dioxide absorbed by the slurry reacts with the water in the slurry to form sulfites ($SO_3^-$). Oxygen may be introduced through a blower or other suitable device (not shown) in order to promote the oxidation of the sulfites to form sulfates ($SO_4^-$), which can thereafter react with the calcium-based slurry to form gypsum as a saleable byproduct of the scrubbing operation.

As before, it can be seen that the apron 228 of the second embodiment serves to reduce the height of the tower 214 by allowing the lower bank of spray headers 216 to be positioned adjacent the inlet duct 212. The apron 228 also provides the other benefits noted with the first embodiment of this invention, including enhanced distribution of flue gases within the tower 214, a reduced inlet duct height, and the ability to form the inlet duct 212 from a carbon steel. Furthermore, the spray tower 210 is characterized by limestone being more readily dissolved and a lower pH for the slurry solution, resulting in higher purity gypsum as a byproduct and a lower overall alkali consumption.

While our invention has been described in terms of preferred embodiments, it is apparent that other forms could be adopted by one skilled in the art, such as by incorporating the novel features of this invention within spray towers and other gas-liquid contactors which structurally differ from that shown in the Figures. Accordingly, the scope of our invention is to be limited only by the following claims.

What is claimed is:

1. A scrubbing apparatus for removing gases and particulate matter in flue gases, the scrubbing apparatus comprising:

a passage having a lower end and an upper end;

an inlet to the passage through which flue gases are introduced into the passage;

an enclosure disposed adjacent the inlet and within the passage, the enclosure having an upper end joined to the passage and a lower end defining an opening for the flue gases introduced into the passage through the inlet, the opening being disposed below at least a portion of the inlet, the upper end of the enclosure having a larger diameter than the lower end of the enclosure;

means for introducing a fluid into the enclosure so as to remove gases and particulate matter from the flue gases; and an outlet disposed at the upper end of the passage through which gases escape the passage.

2. A scrubbing apparatus as recited in claim 1 wherein the introducing means is located within the enclosure at an elevation of not greater than the inlet to the passage.

3. A scrubbing apparatus as recited in claim 1 wherein the passage circumscribes the enclosure so as to form a circumferential gap therebetween, the scrubbing apparatus further comprising means for introducing a fluid into the circumferential gap between the enclosure and the passage.

4. A scrubbing apparatus as recited in claim 1 wherein the opening in the enclosure is disposed entirely below the inlet.

5. A scrubbing apparatus as recited in claim 1 further comprising a second means for introducing a fluid, the second introducing means being located in the passage above the enclosure.

6. A scrubbing apparatus as recited in claim 1 further comprising means for eliminating mist from gases flowing through the passage.

7. A scrubbing apparatus as recited in claim 1 further comprising a tank located at the lower end of the passage, and means for pumping fluids accumulated in the tank to the introducing means.

8. A scrubbing apparatus as recited in claim 7 further comprising means for removing solids from the fluids prior to the fluids being delivered to the introducing means.

9. A spray tower for removing gases and particulate matter in flue gases, the spray tower comprising:

a tower having a lower end and an upper end;

a tank located at the lower end of the tower;

an inlet located above the tank through which flue gases are introduced into the tower;

an enclosure disposed adjacent the inlet and within the tower, the tower circumscribing the enclosure so as to form a circumferential gap therebetween, the enclosure having an upper end joined to the tower and a lower end defining a cylindrical opening for the flue gases introduced into the tower through the inlet, the cylindrical opening being disposed below the inlet and above the tank;

a first plurality of sprayers disposed within the enclosure at an elevation not greater than the inlet of the tower, the first plurality of sprayers being adapted to spray a fluid so as to remove gases and particulate matter from the flue gases within the enclosure, the fluid thereafter accumulating in the tank;

a second plurality of sprayers disposed in the tower above the first plurality of sprayers, the second plurality of sprayers being adapted to spray a fluid so as to further remove gases and particulate matter from the flue gases, the fluid thereafter accumulating in the tank;

means for pumping fluids accumulated in the tank to the first and second plurality of sprayers; and an outlet disposed at the upper end of the tower through which gases escape the tower.

10. A spray tower for removing gases and particulate matter in flue gases, the spray tower comprising:

a tower having a lower end and an upper end;

a tank located at the lower end of the tower;

an inlet located above the tank through which flue gases are introduced into the tower;

an enclosure disposed adjacent the inlet and within the tower, the tower circumscribing the enclosure so as to form a circumferential gap therebetween, the enclosure having an upper end joined to the tower and a lower end defining an opening for the flue gases introduced into the tower through the inlet, the opening being disposed below the inlet and above the tank;

a plurality of sprayers disposed in proximity to the enclosure at an elevation of not greater than the inlet to the tower, the plurality of sprayers being adapted to spray a fluid so as to remove gases and particulate matter from the flue gases within the enclosure, the fluid thereafter accumulating in the tank;

means for pumping fluids accumulated in the tank to the plurality of sprayers; and an outlet disposed at the upper end of the tower through which gases escape the tower.

11. A spray tower as recited in claim 10 wherein the plurality of sprayers are located within the enclosure.

12. A spray tower as recited in claim 10 wherein the plurality of sprayers are located outside the enclosure.

13. A spray tower as recited in claim 10 wherein the enclosure has a cylindrical shape.

14. A spray tower as recited in claim 10 wherein the upper end of the enclosure has a larger diameter than the lower end of the enclosure.

15. A spray tower as recited in claim 10 wherein the lower end of the tower has an enlarged flared portion, the enclosure being disposed within the enlarged flared portion.

16. A spray tower as recited in claim 10 further comprising a second means for spraying fluid, the second spraying means being located in the tower.

17. A spray tower as recited in claim 10 further comprising means for removing solids from the fluids prior to the fluids being delivered to the plurality of sprayers.

18. A spray tower as recited in claim 10 further comprising means for aerating the fluids accumulated in the tank.

19. A spray tower as recited in claim 10 further comprising a baffle disposed in the tank, the pumping means drawing the fluids from the baffle.

* * * * *